Patented Feb. 25, 1930

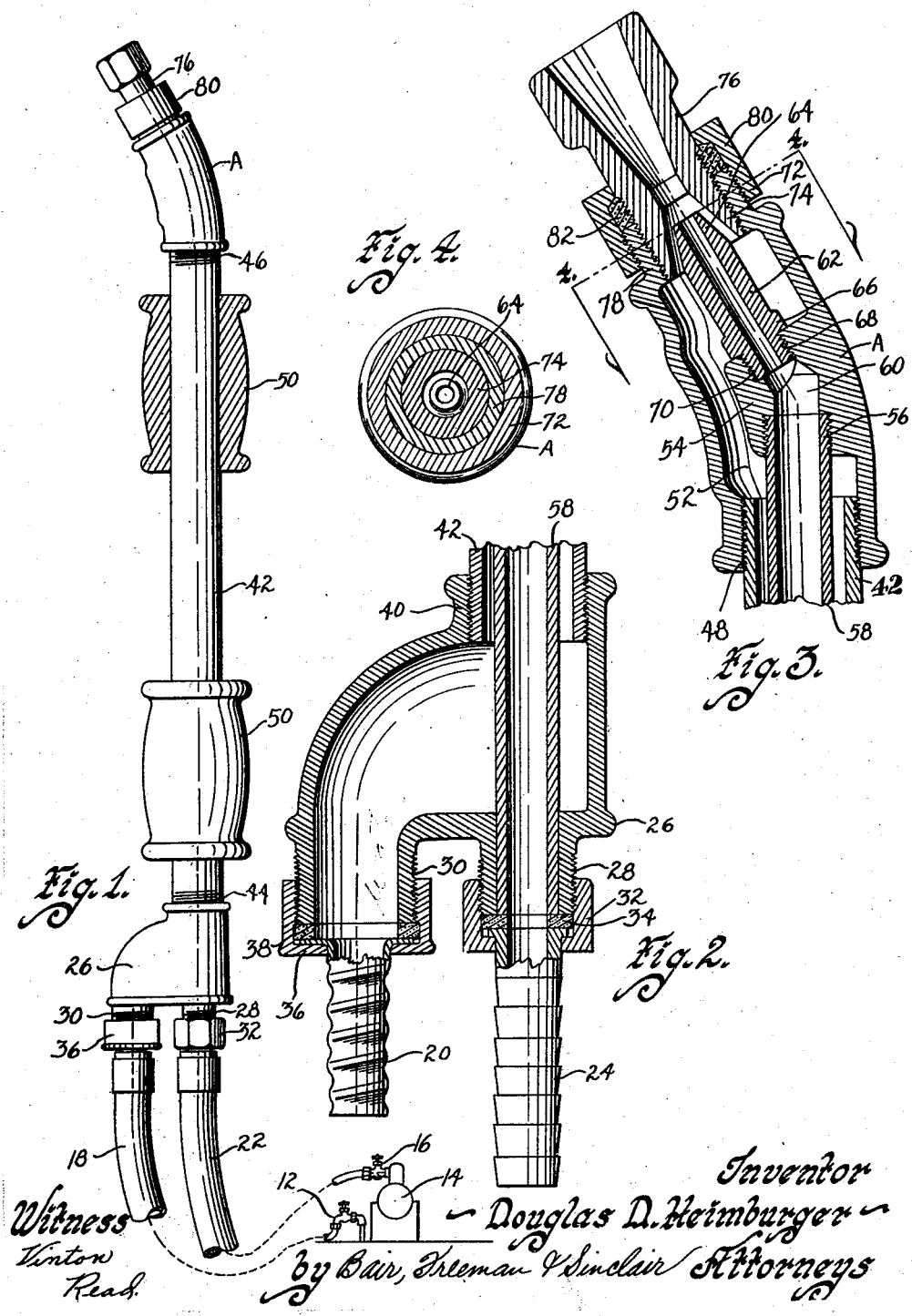

1,748,604

UNITED STATES PATENT OFFICE

DOUGLAS D. HEIMBURGER, OF ST. LOUIS, MISSOURI, ASSIGNOR TO MARQUETTE MANUFACTURING COMPANY, OF ST. PAUL, MINNESOTA

STEAM NOZZLE

Application filed April 16, 1928. Serial No. 270,510.

The object of my invention is to provide a steam nozzle primarily adapted for use in connection with the washing of automobiles, wherein foreign matter upon the automobile may be quickly and easily removed therefrom by the so-called cutting process.

More particularly, my invention relates to a nozzle having a Venturi tube-shaped end arranged at the discharge end of the entire nozzle, together with a steam nozzle projecting into one end of the Venturi tube-shaped element and providing an annular opening around the steam nozzle, so that water may pass into the Venturi tube-shaped element in the form of a hollow column, and steam discharged through the steam nozzle may enter within the hollow column of water and become thoroughly mixed therewith.

Still a further object is to provide the discharge end of the nozzle at an angle relative to the entire body thereof and to form the body of an elongated tubular element or casing adapted to contain water, and to mount a second tubular element within the first tubular element arranged to carry live steam, so that the steam may preheat the water within the outer, tubular element before it and the steam are permitted to commingle and before they are discharged to atmosphere.

Still another object is to arrange the Venturi tube-shaped discharge end of the nozzle, so that it is capable of longitudinal movement, whereby the size of the opening around the steam discharge nozzle may be varied or may be entirely closed, so that only steam may be discharged from the nozzle, if so desired.

Still another object is to provide a pair of hand gripping members mounted on the nozzle proper, formed of such substance as to retard the transmission of heat, wherein the device may be properly held for operation.

With these and other objects in view, my invention consists in the construction, arrangement and combination of the various parts of my steam nozzle, whereby the objects contemplated are attained, as hereinafter more fully set forth, pointed out in my claims, and illustrated in the accompanying drawings, in which:

Figure 1 is a plan view of my improved steam nozzle and a diagrammatic view of a boiler for creating steam, and a source of water supply, both of which are valve-controlled.

Figure 2 is a sectional view through the rear end of the nozzle proper, showing the adaptors for connection with a source of water supply and a source of steam supply.

Figure 3 is a central, sectional view taken through the discharge end of the nozzle and showing the fitting whereby the discharge end is arranged at an angle relative to the body proper; and Figure 4 is a sectional view taken on the line 4—4 of Figure 3, illustrating the annular ring or space around the discharge end of the steam nozzle.

In the accompanying drawings, I have used the reference numeral 10 to indicate generally a source of water supply, which is arranged with the faucet or other valve-controlled element 12, whereby the supply may be cut off or controlled.

A boiler device 14 is employed for supplying live steam to the nozzle, and a valve element 16 is arranged for controlling the supply of live steam.

Suitable hose 18 is connected at one end to the water supply 10 and at its other end to an adaptor 20, which in turn is connected to the nozzle proper in the manner that I will hereinafter more fully set forth.

A piece of hose 22 is employed for connecting the source of steam supply with the nozzle proper. A fitting or adaptor 24 is arranged for receiving one end of the hose 22.

My nozzle includes a fitting or housing member 26, having a pair of spaced, screw-threaded necks 28 and 30. The neck 28 is arranged in communication with the adaptor 24 and is held in connected relationship by a connector nut 32. A suitable washer 34 is interposed between one end of the neck 28 and the adaptor 24.

The water hose adaptor 20 is connected to the neck 30 by means of a connector nut 36. A suitable washer 38 is interposed between the outer end of the neck 30 and the adaptor 20.

By connecting the connector nuts 32 and 36, I am able to securely fasten the adaptors 20 and 24 to the fitting or housing element 26.

The housing element 26 is provided with a single discharge opening at its other end, which is internally screw-threaded as at 40.

An elongated tube or pipe 42 has both of its ends screw-threaded as at 44 and 46. The screw-threaded end 44 is connected to the internally screw-threaded opening 40 in the element 26.

A fitting A, which is slightly curved in cross section, is formed at one end with a screw-threaded opening 48 adapted to coact with the screw-threads 46 on the free end of the pipe 42.

The pipe 42 serves as an elongated casing for the transmission of water as will hereinafter be more fully set forth.

A pair of hand-grips 50, preferably formed of non-heat conducting material are mounted upon the pipe 42.

The fitting A is provided with an open chamber 52, into which extends a boss 54. The boss 54 is provided with a screw-threaded opening 56, which receives one end of an inner pipe 58. The inner pipe 58 has one end screw-threaded, which coacts with the screw-threads 56. The other end of the pipe 58 is received within the neck 28 of the fitting 26 and rests against the washer 34, for providing a tight connection at that end.

The boss 54 is provided with an opening 60, so that steam or the like passing from the adaptor into the pipe 58 will be transmitted into the opening 60 of the boss 54.

A steam nozzle 62 has an exteriorly tapered end 64, the purpose of which will be hereinafter more fully set forth.

The nozzle 62 is provided with a central opening of considerably less diameter than the diameter of the pipe 58, so that steam passing from the pipe 58 will be restricted through the small opening in the nozzle 62, thus greatly increasing the velocity of the steam as it passes through the opening in the nozzle 62.

The nozzle 62 is provided with a wrench engaging portion 66 and a screw-threaded shank 68 arranged to coact with a screw-threaded opening 70 formed in the boss 54 proper.

The extreme outer end of the fitting A is formed with exterior screw-threads 72 and interior screw-threads 74.

A Venturi tube-shaped element or nozzle tip 76 is arranged with a screw-threaded portion 78 for coacting with the interior screw-threads 74, as clearly illustrated in Figure 3 of the drawings.

A connecting nut or packing nut 80 coacts with the screw-threads 72 and may be adjusted for tightening the packing material 82 against the fitting A for providing a steam and water-tight connection between the nozzle tip 76 and the fitting A.

The nozzle tip 76 is Venturi tube-shaped—that is, there is provided a short, tubular space or opening, which is provided with flared or funnel-shaped openings at each end, which are, of course, all connected together, and thus form the Venturi tube-shaped nozzle tip.

It will be noted that the nozzle tip 76 is capable of adjustment towards or from the fitting A, and that the tapered end 64 of the steam nozzle 62 projects into the nozzle tip 76.

It will be further noted that an annular opening is formed around the discharge end of the steam nozzle 62 and that by movement of the nozzle tip 76 towards or from the fitting A, it makes the opening around the steam nozzle larger or smaller.

The entire opening may be closed by screwing the nozzle tip 76 a sufficient distance inwardly relative to the fitting A, so that the tapered portion 64 of the steam nozzle end coacts with the flared walls of the Venturi tube-shaped element 76.

My device is primarily adapted for use in connection with washing automobiles and for removing paint and grease from automobiles when desired and necessary.

Steam alone may be discharged through the nozzle tip 76 by closing off the water opening around the steam nozzle.

The steam may be controlled by a suitable valve 16, as heretofore explained.

Water and steam both may be used by providing an opening around the discharge end of the steam nozzle.

Water is permitted to enter the fitting 26 through the adaptor 20 and then is allowed to circulate through the elongated tube 42 around the steam pipe 58 into the chamber 52 of the fitting A, and thereafter to be discharged in the form of a hollow column around the steam discharge nozzle 62. The steam discharged from the nozzle 62 with its increased velocity, due to the restricted opening within the nozzle proper, is admitted into the center of the hollow column of water just before the water and steam both are compelled to pass through the tubular portion and most restricted portion of the Venturi tube-shaped element 76, thus causing the water and steam to be thoroughly mixed before discharge to atmosphere, and at the same time the steam and water are thoroughly mixed and agitated, so that the resultant combination of water and steam when discharged to atmosphere are in the form of a fine mist or spray, and yet of sufficient force necessary to cut grease, and in some cases paint, where desired.

It will be noted that the amount of pressure on the water supply may be varied as desired, and that the size of the opening around the steam discharge nozzle may be varied in size for increasing the pressure, and at the same time the steam may be controlled, so that a proper resultant product or mixture is had.

It will be noted further that the steam within the pipe or tube 58, before it reaches the nozzle 62, is allowed to heat the water encased therearound, and that the water therefore is preheated a considerable amount before it actually mixes with the steam. The water in the outer casing will, of course, not heat up to such an extent that it will preclude easy handling of the same.

I have used my device in actual practice and find that it works satisfactorily for the purposes for which it is primarily intended.

Where I have used the term "steam", it will be, of course, understood that I do not intend to limit myself to steam in a strict sense, and that my device may be used in connection with air under pressure and other fluids.

Some changes may be made in the construction and arrangement of the various parts of my steam nozzle, without departing from the essential features and purposes of my invention, and it is my intention to cover by my claims, any modified forms of structure or use of mechanical equivalents, which may be reasonably included within their scope.

I claim as my invention:

1. A steam nozzle comprising an elongated outer tubular element, an interior tubular element, a fitting at each end of said elements for connecting them together in spaced relationship, said interior element being adapted to deliver steam and said outer element being adapted to carry water surrounding the interior element whereby the steam serves to heat the water in its passage through the outer element and said water serves as a means to prevent the outer element from becoming heated by the steam to such a degree as to burn the hand of an operator holding the nozzle, a Venturi-shaped nozzle tip carried by one end of one of said fittings, a steam nozzle carried by the same fitting having a portion projecting into said nozzle tip, as and for the purposes stated.

2. A steam nozzle comprising an elongated, outer tubular element, an interior tubular element, a fitting at each end of said elements for connecting them together in spaced relationship, whereby steam may be delivered through said interior element and water carried by said outer element, a Venturi-shaped nozzle tip carried by one end of one of said fittings, a steam nozzle carried by the same fitting having a portion projecting into said nozzle tip, the fitting carrying said steam nozzle being curved lengthwise thereof and having a lug into which an end of the interior tubular element and an end of the steam nozzle extend, whereby the steam nozzle is arranged at an angle relative to the interior tubular element and so that the Venturi shaped nozzle tip is arranged at an angle relative to the outer tubular element.

Des Moines, Iowa, April 11, 1928.

DOUGLAS D. HEIMBURGER.